Figure 1:
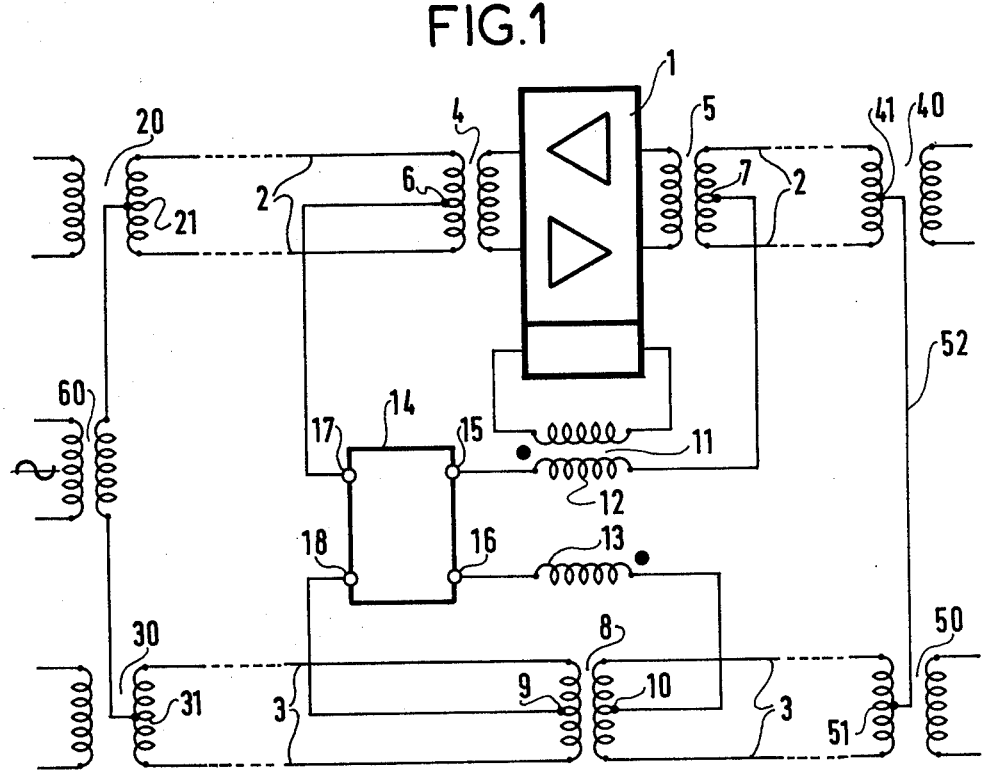

United States Patent [19]

Migeon

[11] 4,088,850

[45] May 9, 1978

[54] REMOTE SUPPLY SYSTEM FOR A CABLE TRANSMISSION LINE WITH REPEATERS SUBJECTED TO THE INFLUENCE OF EXTERNAL ELECTRIC FIELDS

[75] Inventor: René Migeon, Paris, France

[73] Assignee: Compagnie Industrielle des Telecommunications Cit-Alcatel S.A., Paris, France

[21] Appl. No.: 774,562

[22] Filed: Mar. 4, 1977

[30] Foreign Application Priority Data

Mar. 4, 1976 France .................................. 76 06174

[51] Int. Cl.² .................. H04B 3/44; H04L 25/20
[52] U.S. Cl. ................... 179/170 J; 178/70 R
[58] Field of Search .......... 179/170 J, 170 D, 170 H, 179/170 R, 175.31 R; 178/70 R, 70 TS, 71 R, 73

[56] References Cited

FOREIGN PATENT DOCUMENTS 1,279,758  10/1968  Germany ........................ 179/170 J

*Primary Examiner*—Thomas A. Robinson
*Attorney, Agent, or Firm*—Sughrue, Rothwell, Mion, Zinn and Macpeak

[57] ABSTRACT

The invention relates in particular to remote supply with AC of repeaters of a transmission line with symmetrical pairs. It provides a remote supply system in which the AC remote supply passes through a loop formed by two pairs of the line and in which each repeater is supplied by the secondary winding of a current transformer whose primary winding is formed by two identical windings inserted in series opposition, one in one of the pairs forming the remote supply loop, the other in the other of these pairs. It applies advantageously to the transmission lines which have a path common to an electric power line as is the case for example with a transmission line along electrified railway lines.

3 Claims, 4 Drawing Figures

U.S. Patent May 9, 1978 4,088,850

REMOTE SUPPLY SYSTEM FOR A CABLE TRANSMISSION LINE WITH REPEATERS SUBJECTED TO THE INFLUENCE OF EXTERNAL ELECTRIC FIELDS

This invention relates to the remote A.C. supply of repeaters of a transmission line and in particular where the transmission line is in a cable subject to the influence of large external electromagnetic fields e.g. because of its proximity to a power line electricity distribution grid or railway electrification.

The external electromagnetic fields induce longitudinal voltages on transmission lines which have numerous disadvantages. For this reason, the proximity and the parallelism between the paths of a transmission line and a power line are avoided as much as possible. However, it sometimes happens that a common path is necessary because of the economic advantages it provides: e.g. less land area taken up, lower installation cost, especially in hilly or mountainous country. Some types of transmission lines are less sensitive than others to induced longitudinal voltages. This is the case in particular with symmetrical pair transmission lines in which the signals transmitted are not greatly perturbed. Indeed, the induced longitudinal voltages on the two wires of a same pair are substantially equal due to their close proximity and their being twisted about each other. The fields induce currents of same intensity and of same direction which are easy to separate from the differential currents flowing in the wires of the pair and representing the useful transmission signal.

The repeaters of a transmission line with symmetrical pairs are generally remote supplied from the ends of the line with AC flowing through a loop formed by two pairs which are interconnected at the ends of the line, either directly or via a current source. Each repeater is supplied via a transformer whose primary winding is inserted in series in one of the pairs forming the remote supply loop. With such a configuration, the sum of the currents induced by the external fields in the wires of the said one pair flows through the primary winding of the supply transformer of a repeater. This sum of induced currents is added to or subtracted from the supply current supplied to each repeater. This results in random overvoltages and undervoltages which are detrimental to the proper operation of the repeaters.

To limit the dangers of breakdown of the cable insulation and the danger to personnel the longitudinal voltages induced in a transmission line are attenuated by shielding the transmission line and by dividing it into sections isolated from each other. However this attenuation does not make it possible to eliminate the disruption of the remote supply.

Preferred embodiments of the present invention provide a remote supply which is relatively insensitive to longitudinal voltages which are induced under the influence of external electromagnetic fields.

The present invention provides a system for remote AC power supply of the repeaters of a transmission line in which the remote supply current passes through the line following an outgoing path and a return path forming a remote supply loop and wherein the local power supply circuit of each repeater comprises a current transformer having two identical primary windings inserted in the remote supply loop at the repeater, one on the outgoing path, the other on the return path so as to draw from each of them in equal quantities the power necessary for supplying the repeater and for ensuring the continuity of the remote supply loop.

Figure 2:
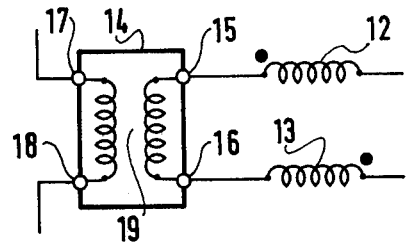
Figure 3:
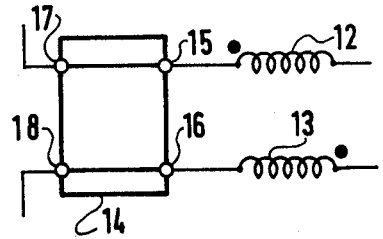
Figure 4:
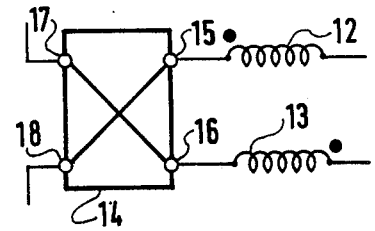

Other characteristics and advantages of the invention will become apparent from the attached claims and from the description hereinbelow of various embodiments given by way of example. This description is given with reference to the accompanying drawing in which:

FIG. 1 is the partial circuit diagram of a remote supply system embodying the invention; and FIGS. 2, 3 and 4 are different embodiments of wiring for a terminal unit placed for each repeater in the remote supply system shown in FIG. 1.

The transmission line in question comprises first and second symmetrical cable pairs 2 and 3 used for the remote supply loop. The first pair 2 is used for an $n + n$ transmission system whose wideband signal requires periodic regeneration by repeaters (e.g. repeater 1) spaced out along the line. The second pair 3 is a service line used for the transmission of a low-frequency signal and does not include repeaters. According to conventional technology each of the pairs 2 and 3 simultaneously transmits signal current coded in differential mode (i.e. flowing along the wires of a same pair in opposite directions) and the remote supply current flowing in common mode, (i.e. being shared between the two wires of a same pair with equal currents flowing in the same direction). The signal current and the remote supply current at the ends of a section of a line pair 2 or 3 are separated or superimposed by differential transformers 4, 5, 8, 20, 30, 40, 50 each comprising a primary winding and a secondary winding at least one of which has a centre tap and is connected by its ends to the wires of the pair. The transformers transmit the signal current since this current flows in differential mode in the wires of each pair. They block the remote supply current which flows in common mode in the same pair and whose circuit must be completed by connection to the centre tap.

The remote supply source is not shown. It is connected via a transformer 60 to the centre taps 21 and 31 of the differential transformers 20 and 30, placed at the beginning of a remote supply section at the ends of the wires of the pairs 2 and 3 to connect the pairs either to another section of the line or to terminal equipments. The differential transformers 20 and 30 allow the introduction of the remote supply current on the pairs 2 and 3 of the line, in common mode, in the two wires of a same pair (i.e. differential mode between the two pairs 2 and 3).

Differential transformers 40 and 50 are placed at the end of a section of a remote supply system at the ends of the pairs 2 and 3 for connection either to another section or to another line or to terminal equipments. A connection 52 connects their centre taps 41 and 51 and closes the remote supply loop.

Two differential transformers 4 and 5 with centre taps 6 and 7 are disposed on either side of each repeater 1 between the input-output elements of the repeater and the ends of the sections of the first pair 2. They form selection means which separate the signal currents bearing the remote supply current at each repeater 1 and which cut the remote supply loop on the first pair 2 at that point also. A differential transformer 8 whose primary and secondary windings have centre taps 9 and 10 is inserted in the second pair 3 at the repeater 1 and cuts the remote supply relay on this second pair 3.

The local remote supply circuit of the repeater 1 comprises a current transformer 11 having two identical primary windings 12 and 13 inserted in the remote supply loop via a terminal box 14 at the cuts on the first pair 2 by means of the differential transformers 4 and 5 and on the second pair 3 by means of the differential transformer 8. The primary winding 12 is connected by one end to the centre tap 7 of the differential transformer 5 and by the other end to the terminal 15 of the terminal box 14. The primary winding 13 is connected by one end to the centre tap 10 of the differential transformer 8 and by the other to the terminal 16 of the terminal box 14. The terminal box 14 also has two other terminals 17 and 18 connected respectively to the centre tap 6 of the differential transformer 4 and to the centre tap 9 of the differential transformer 8.

FIGS. 2, 3, and 4 show various possible wiring configurations for the terminal box 14. In FIG. 2, an isolation transformer 19 has one of its windings connected between the terminals 15, 16 and the other between the terminals 17, 18. It completes the metallic isolation made on the pairs 2 and 3 on either side of the repeater 1 by the differential transformers 4, 5, and 8. With this sort of wiring the primary windings 12 and 13 of the current transformer 11 are connected in series via a winding of the isolation transformer 19. In FIG. 3, the terminals 17 and 15 are short-circuited as are the terminals 18 and 16. The primary winding 12 of the current transformer 11 is then connected across the repeater 1 between the centre tap 6 and 7 of the differential transformers 4 and 5 which interrupt the remote supply loop on the pair 2. The primary winding 13 of the current transformer 11 is connected between the centre tap 9 and 10 of the differential transformer 8 which interrupts the remote supply loop on the pair 3. In FIG. 4, the connections are cross-connected, the terminals 16 and 17 being short-circuited as are the terminals 15 and 18. The primary winding 12 of the current transformer 11 is connected on one side of the repeater 1 to the ends of the wires of the first pair 2 via the centre tap 7 of the differential transformer 5 and on the other side to the ends of the wires of the second pair 3 via the centre tap 9 of the differential transformer 8. Similarly, the other primary winding 13 of the current transformer 11 is connected on one side of the repeater 1 to the ends of the wires of the first pair 2 via the centre tap 6 of the differential transformer 4 and on the other side to the ends of the wires of the second pair 3 via the centre tap 10 of the differential transformer 8.

The remote supply current flows through the line along outgoing and return paths forming a loop. In all the cases of FIGS. 2, 3, and 4, the primary windings 12 and 13 of the current transformer 11 are inserted respectively in the outgoing path and in the return path of the remote supply loop. As shown in FIG. 1, they are connected so that the currents induced by the remote supply current which passes through them in opposite directions are added together. The result of this is that the power necessary for supplying the repeater 1 and available at the secondary winding of the current transformer 11 is sampled in equal quantities on the outgoing and return paths of the remote supply loop.

With the wiring of the terminal box 14 shown in FIG. 4, the crossing of the connections enables a reversal of the functions of the outgoing path and of the return path to be fulfilled by the pairs 2 and 3 in the remote supply loop and consequently an equalization of the electrical characteristics of the outgoing and return paths of the remote supply loop, in particular in the case where the pairs 2 and 3 have different electrical characteristics.

An external field induces on the outgoing and return paths of the remote supply loop currents having the same direction and analogous amplitudes which are looped by earth. These induced currents pass through the primary windings 12 and 13 of the current tranformer 11 and generate at the secondary winding of the transformer a current which is a function of their difference. Due to the proximity and analogous characteristics of the outgoing and return paths of the remote supply loop the difference between the induced currents remains very small. The result of this is that in a remote supply system embodying the invention, the supply of a repeater is not greatly perturbed by the action of the external electric fields on the remote supply line and in particular by sudden variations of these electric fields due to the interruptions occurring in neighbouring power lines.

The invention is not limited to the example described; it applies to other kinds of telecommunications lines with repeaters. The remote supply loop can be constituted by the pairs of a 4-wire system comprising repeaters and each being used for a determined transmission direction. It can also be constituted by a pair equipped with repeaters and a return wire. Further, the local supply circuit of each repeater can comprise more than one current transformer. This can be the case in particular when the two transmission directions are treated separately in the repeaters by two amplifiers supplied individually by two current transformers. The primary windings of these transformers are then connected in series two by two.

The remote supply system according to the invention is advantageously applied to cable transmission line with repeaters running along an electrified railway line.

What we claim is:

1. A remote supply system for remote AC power supply of the repeaters of a transmission line, said transmission line including at least one repeater, said remote supply system comprising: an outgoing path and a return path forming a remote supply loop in which the remote supply current passes through the line, a local power supply circuit for each repeater, said local power supply circuit comprising a current transformer having two identical primary windings inserted in the remote supply loop at the repeater, one on the outgoing path, the other on the return path so as to draw from each of them in equal quantities the power necessary for supplying the repeater and for ensuring the continuity of the remote supply loop, and means for connecting said primary windings of the current transformer between the ends of different sections of the remote supply loop so as to exchange the outgoing and return path functions fulfilled by the conductors used for the remote supply loop.

2. A remote supply system according to claim 1, wherein the local supply circuit further comprises an isolation transformer one of whose windings is connected across the ends of the different sections of the remote supply loop on one side of the repeater and whose other winding is connected in series between the two primary windings of the current transformer, and wherein the other ends of these primary windings are connected to the remaining sections of the remote supply loop.

3. A remote supply system according to claim 1, for a transmission line comprising symmetrical cable pairs, two of which are used for the remote supply loop, said repeater being only within one of said pairs, and wherein the primary windings of the current transformer of the local supply system of the repeater is connected to the pair with a repeater via center taps of differential transformers disposed on either side of the repeater to provide metallic isolation of said repeater and to the pair without a repeater via center taps of a differential transformer disposed on said pair level with the repeater and dividing said pair into sections.

* * * * *